Aug. 13, 1968
W. M. RICH, JR., ET AL
3,396,610
TRANSMISSION MECHANISM
Filed March 24, 1966
4 Sheets—Sheet 2
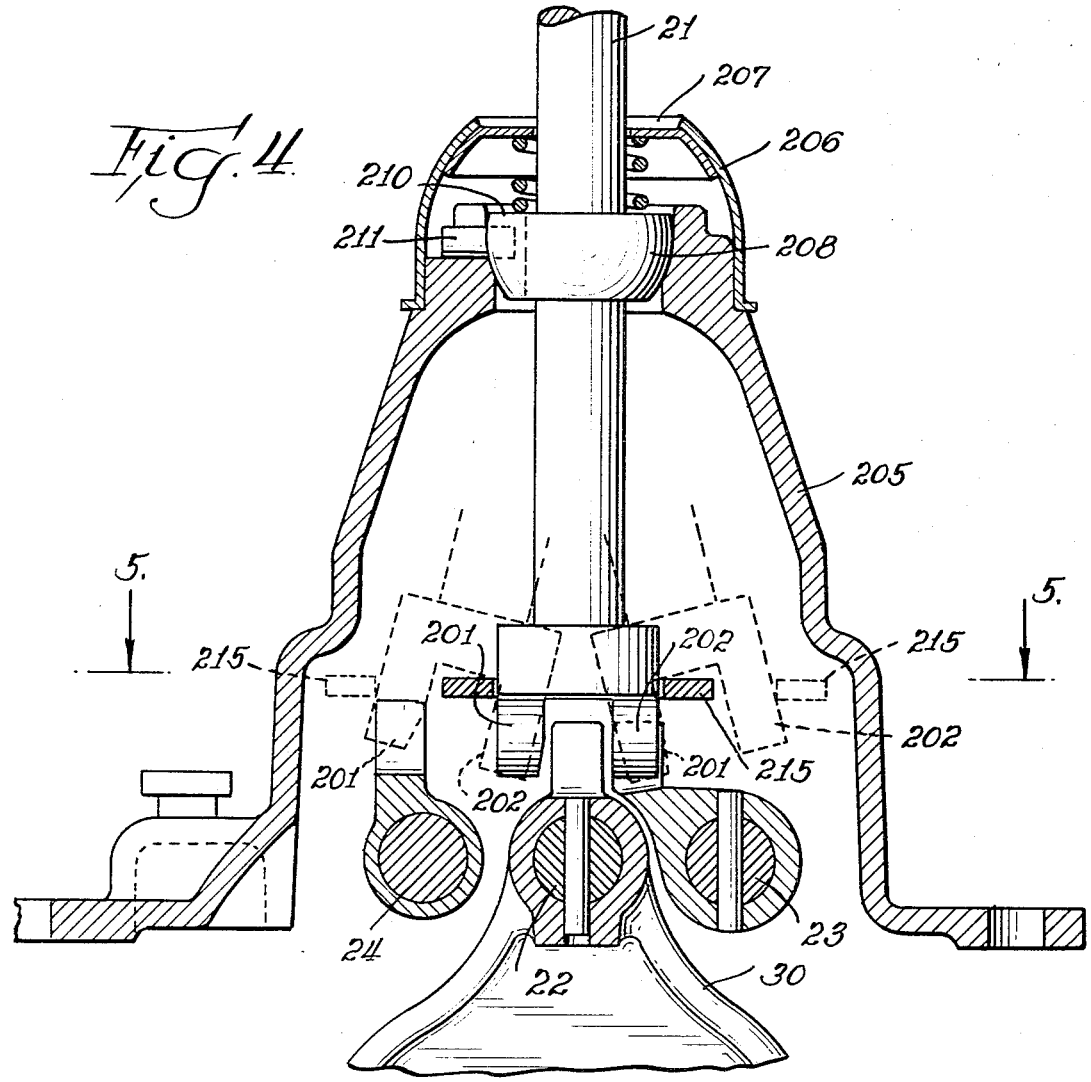
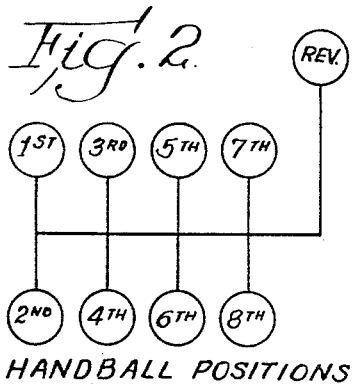
HANDBALL POSITIONS
Inventors
William M. Rich, Jr.
and George E. Flinn
By Robert L. Zieg
Att'y.

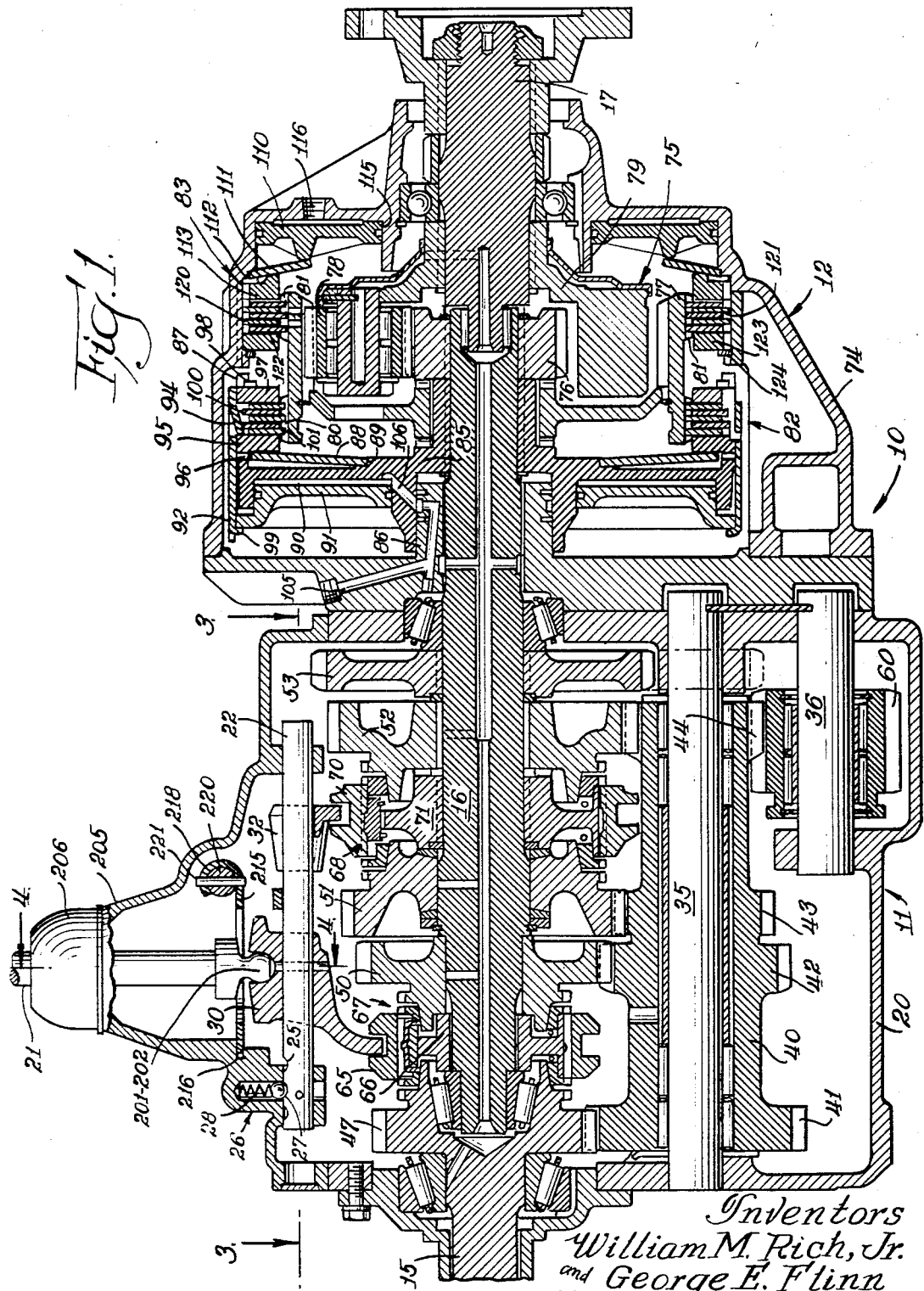

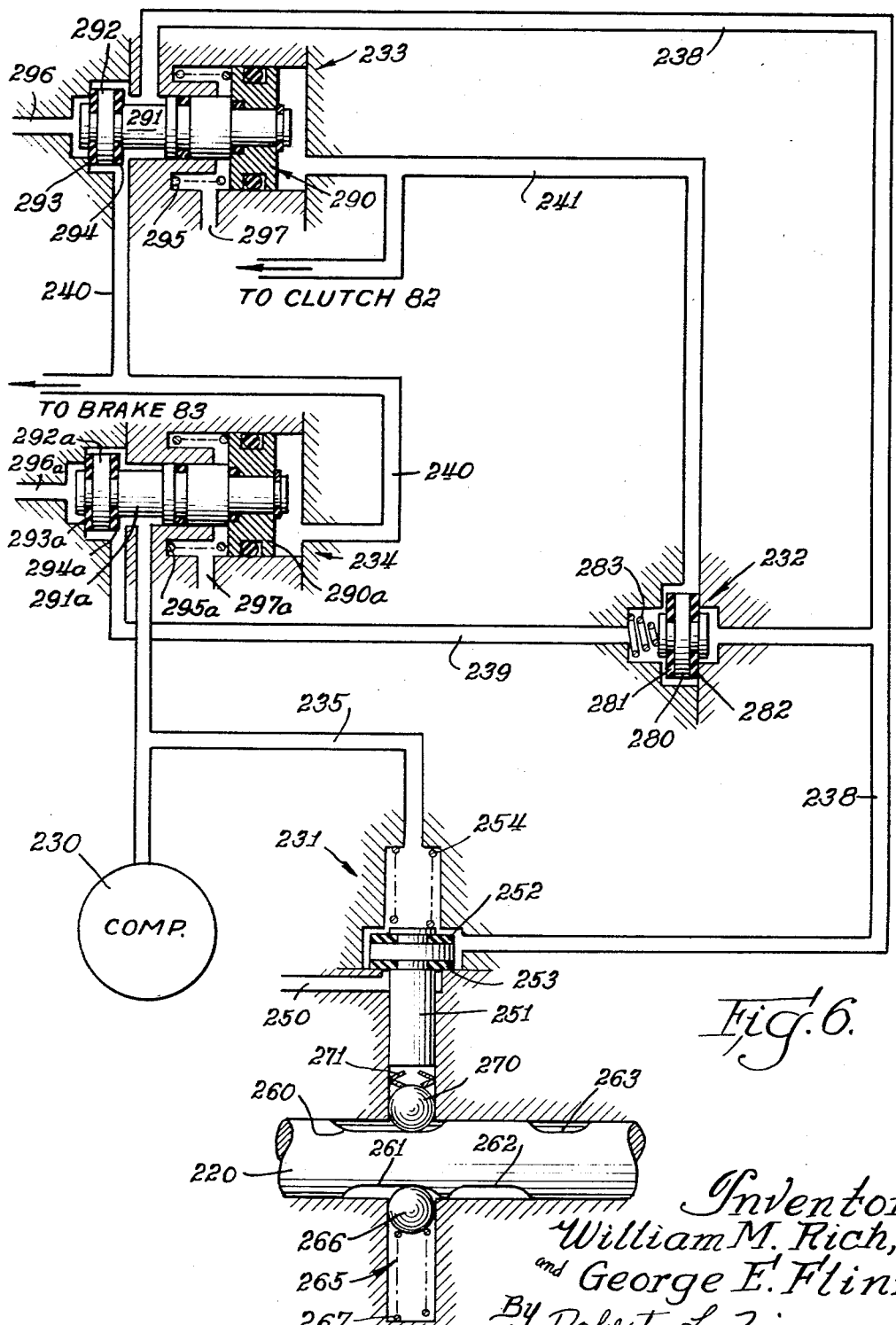

Inventors
William M. Rich Jr.
and George E. Flinn
By Robert L. Zieg atty.

United States Patent Office 3,396,610
Patented Aug. 13, 1968

3,396,610
TRANSMISSION MECHANISM
William M. Rich, Jr., and George E. Flinn, Muncie, Ind., assignors to Borg-Warner Corporation, Chicago, Ill., a corporation of Illinois
Filed Mar. 24, 1966, Ser. No. 537,220
10 Claims. (Cl. 74—740)

ABSTRACT OF THE DISCLOSURE

A transmission comprising a 4-speed manually shifted transmission in combination with a 2-speed planetary gear set providing 8 forward drive ratios, the planetary gear set being adapted to be shifted by air or other fluid pressure and the transmission having a single control lever to select any of the 8 forward drive ratios with no additional buttons or levers required.

---

The invention consists of the novel constructions, arrangements and devices to be hereinafter described and claimed for carrying out the above stated objects and such other objects as will appear from the following description of preferred embodiments of the invention illustrated with reference to the accompanying drawings wherein:

FIGURE 1 is a cross-sectional view of the transmission mechanism of the present invention;

FIGURE 2 is a schematic view of the positions of the manual shift lever of the transmission;

FIGURE 4 is a cross-sectional view taken along the lines 4—4 of FIGURE 1;

FIGURE 6 is a schematic diagram of the control system of the transmission.

Figure 3:
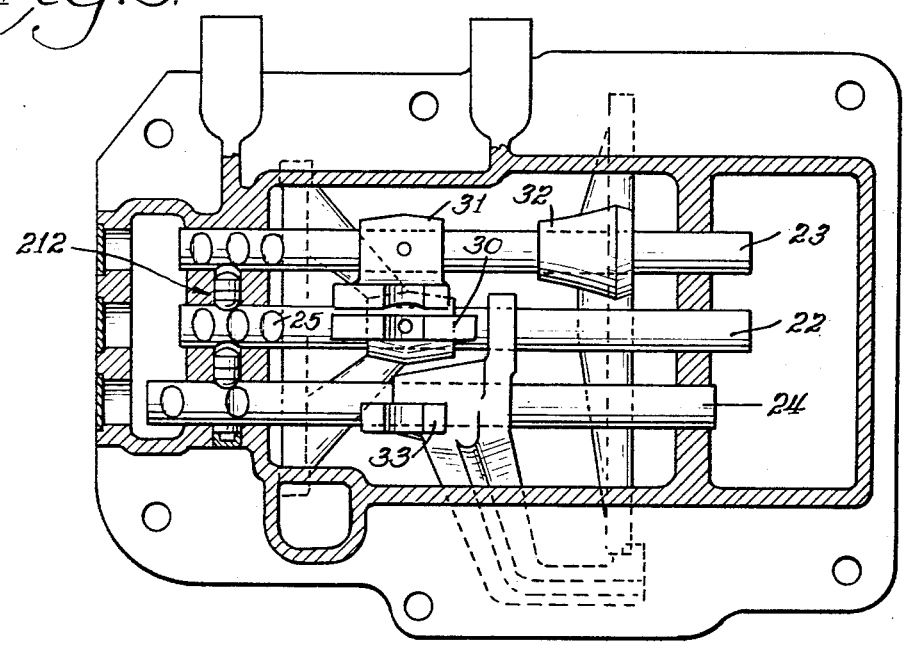
FIGURE 3 is a cross-sectional view taken along lines 3—3 of FIGURE 1.

Referring to FIGURE 1, the transmission mechanism 10 includes a forward section 11 and a rear section 12. The transmission is provided with an input shaft 15, an intermediate shaft 16 and a driven or output shaft 17.

The front section 11 comprises a manual 4-speed transmission provided with a casing 20. Mounted within the casing 20 is a manual shift lever 21. Operatively associated with the lower end of the manual lever 21 is an axially movable shaft or shift rail 22. Referring to FIGURE 3, shift rails 23 and 24 are also provided in the casing 20. Each of the shift rails includes indentations 25 which are engaged by a ball detent mechanism 26 including a ball 27 urged by a spring 28 into engagement with the indentations 25 to thereby position each of the shift rails in their various axial positions.

Carried on the shift rail 22 is a shift fork 30 which is engageable by the manual lever, carried on shift rail 23 is a shift collar engageable by the manual lever 21. A shift fork 32 is provided fixed for axial movement with shift rail 23. Carried on shift rail 24 is a shift fork 33 which is engageable by manual lever 21. Shift rail 22 is utilized when establishing 3rd, 4th, 7th or 8th speed ratios; shift rail 23 is utilized when establishing 1st, 2nd, 5th or 6th speed ratios; and shift rail 24 is utilized when establishing reverse drive ratio.

Mounted within the casing 20 is a countershaft 35 and a reverse idler shaft 36. Countershaft 35 has a sleeve shaft 40 rotatably journalled thereon which has gears 41, 42, 43 and 44 integral therewith. Integral with the input shaft 15 is a gear 47 which meshes with gear 41 on sleeve shaft 40. Rotatably journalled on intermediate shaft 16 are gears 50, 51 and 52. A reverse gear 53 is drivingly connected to intermediate shaft 16. Gear 42 on sleeve shaft 40 meshes with gear 50, gear 43 on sleeve shaft 40 meshes with gear 51, and gear 44 on sleeve shaft 40 meshes with gear 52.

Rotatably journalled on shaft 36 is a reverse idler gear 60 which meshes with gear 44 on sleeve shaft 40. The reverse idler gear may be shifted axially by fork 33 so that it meshes both with gear 44 and reverse gear 53 when reverse ratio is selected.

A shift collar 65 is provided which is splined to a hub 66 which is drivingly connected to intermediate shaft 16. The collar 65 may be moved to the left by shift fork 30 to drivingly engage input shaft 15 with intermediate shaft 16 and the shift collar 65 may be shifted to the right by shift fork 30 to drivingly connect gear 50 to shaft 16. A synchronizer mechanism generally indicated 67 is provided so that engagement of input shaft 15 with intermediate shaft 16 and engagement of gear 50 with intermediate shaft 16 may be made smoothly. The synchronizer mechanism 67 is of a known type and for a complete description of the operation thereof, reference may be had to U.S. Patent No. 2,221,900 of common assignee.

A shift collar 70 is provided drivingly connected by splines to a hub 71 which is drivingly connected to intermediate shaft 16. The shift collar 70 may be moved to the right by shift fork 32 to drivingly connect gear 52 with intermediate shaft 16. A synchronizer mechanism generally indicated at 68 is provided of a similar type to synchronizer mechanism 67 which facilitates smooth engagement of either of gears 51 and 52 with intermediate shaft 16.

The operation of the transmission of the front section 11 is as follows: first speed ratio, or the lowest speed ratio of the front section is available by the movement of shift fork 32 moving shift collar 70 to the right to drivingly connect gear 52 to intermediate shaft 16. The intermediate shaft will then be driven by means of input shaft 15, gear 47, gear 41, sleeve shaft 40, gear 44 and gear 52 in the forward direction.

The second lowest drive ratio of the front section 11 is obtained by moving shift collar 70 to the left in which position gear 51 drives intermediate shaft 16 through hub 71 by means of input shaft 15, driving through gear 47, gear 41, sleeve shaft 40, gear 43, and driving gear 51. The ratio of gears 43 and 51 being slightly less than that between gears 44 and 52 thus providing a second speed ratio.

The third lowest drive ratio of the front section 11 is established by movement of shift collar 65 to the right by shift fork 30 thus drivingly engaging gear 50 with intermediate shaft 16. Gear 50 is driven by gear 42 on sleeve shaft 40 in a manner similar to that described above for gears 51 and 52. Gears 42 and 50 have a ratio slightly less than that of gears 43 and 51 providing a third speed ratio.

The highest speed ratio of the front section 11 is provided by movement of shift collar 65 to the left to drivingly engage input shaft 15 with intermediate shaft 16 to provide a fourth speed ratio of 1:1.

The rear section 12 of the transmission mechanism includes the improved 2-speed drive planetary mechanism 75 within a casing 74. The planetary gear set 75 includes a sun gear 76 drivingly connected to intermediate shaft 16 and a ring gear 77. A plurality of planetary pinions 78 are provided which are enmeshed with the ring gear 77 and sun gear 76. Planetary pinions 78 are rotatably journalled on a carrier member 79 which is drivingly connected to the output shaft 17. Ring gear 78 has a series of external splines 80 and a series of external splines 81 formed in the outer periphery thereof. Planetary gear assembly 75 is provided with a direct drive clutch mechanism 82 and a brake mechanism 83.

Clutch mechanism 82 includes a hub 85 which is drivingly connected by means of splines to intermediate shaft 16. Hub 85 is rotatably journalled on an extension 86 provided in the casing 74. A ring gear 77 is journalled on hub 85. A Belleville or annular spring 88 is mounted on a shoulder 89 provided on hub 85. Hub 85 has an annular cavity 90 therein in which is mounted the annular clutch piston 91. A clutch drum 92 is provided surrounding hub 85. Around the drum 92 are a plurality of indentations 94 the purpose of which will be described later. The drum 92 is axially slidable with respect to hub 85. A flange 87 is provided on hub 85 within which is mounted a clutch apply plate 95 which engages within slots 96 in the flange 87 of hub 85.

Mounted also within flange 87 and engaging in slot 96 is a clutch back-up plate 97 which is held axially in position by a snap ring 98. A snap ring 99 provides a driving connection between the piston 91 and the clutch drum 92.

A series of clutch plates 100 are drivingly connected and engaged within slots 96 in the flange 87 and a series of clutch plates 101 interspersed between clutch plates 100 are drivingly engaged with exterior splines 80 on ring gear 77.

A passage 105 is provided in casing 74 which connects with a passage 106 in hub 85 which may conduct air or other fluid pressure to cavity 90 to move piston 91. The clutch 82 is pressure-released and spring-applied. When there is no fluid pressure in cavity 90 to hold piston 91 to the left, the Belleville spring 88 acting against hub 85 which is axially stationary applies pressure to pressure plate 95 engaging the series of clutch plates 100 and 101 to drivingly interconnect ring gear 77 with the intermediate shaft 16 and sun gear 76 thereby locking up the planetary gear set to provide a 1:1 direct drive. When air pressure is applied through passages 105, 106 to piston 91, piston 91 will move clutch drum 92 to the left whereby indentations 94 will move the clutch apply plate 95 to the left against the force of Belleville spring 88 thereby releasing the clutch plates 100 and 101 from frictional engagement.

Brake mechanism 83 includes an annular piston 110 which engages a Belleville or annular spring 111. The Belleville spring 111 is held within the casing 74 by a snap ring 112. The Belleville spring 111 serves in this instance as a lever arm engaging a brake apply plate 113 and also serves as a piston return spring. The piston 110 is mounted within an annular cavity formed in the casing 74. A passage 116 is provided through which air or other fluid pressure may be supplied to cavity 115 to move brake piston 110 to the left. Brake discs 120 are engaged with slots 121 provided in the casing 74. Brake apply plate 113 is also drivingly engaged within slots 121. Interspersed with brake discs 120 are a plurality of brake discs 122 which are engaged with splines 81 on ring gear 77. A back-up plate 123 is provided drivingly engaged in slots 121 in casing 74 and held in position by a snap ring 124.

When air or other fluid pressure is admitted to passage 116 the piston 110 will move to the left and will move brake apply plate 113 to the left through the medium of Belleville spring 111 acting as an apply lever to engage the brake discs 120 and 122 to drivingly connect ring gear 77 with casing 12 thus holding ring gear 77 stationary. With the intermediate shaft 16 driving the sun gear 76 in the forward direction and the ring gear 77 held stationary a reduced forward drive ratio is obtained with planetary carrier 79 driving the output shaft 17. The ratio provided by the planetary gear set is approximately 3.3:1 for example.

When air pressure is released from cavity 115 through passage 116 brake piston 110 will be returned to the right by the Belleville spring 11 thus releasing brake 83. As pointed out above the clutch 82 is pressure-release and brake 83 as described is pressure applied.

Thus by applying fluid pressure to the pistons of the brake and clutch at the same time the clutch will be released and the brake 83 applied and when fluid pressure is released from both the brake and the clutch mechanisms the brake 83 will be released and the clutch 82 applied. This is an important consideration since, if air pressure is lost due to malfunction or when the truck in which the transmission is installed may for example be parked with the engine off, the planetary gear set will be locked in the 1:1 drive condition thereby providing an engine braking function to act as a brake for a vehicle when no air pressure exists.

Listed below is a table showing examples of gear ratios which may be obtained from the described transmission mechanism:

| Speed | Ratio |
| --- | --- |
| 1st | 8.22–1.00 |
| 2nd | 6.07–1.00 |
| 3rd | 4.47–1.00 |
| 4th | 3.3–1.00 |
| 5th | 2.48–1.00 |
| 6th | 1.835–1.00 |
| 7th | 1.35–1.00 |
| 8th | 1.00–1.00 |
| Rev | 9.04–1.00 |

Referring to FIGURE 2 the shift pattern is illustrated for movement of manual shift lever 21 to obtain the described gear ratios. In general the operation of the transmission is as follows: the manual shift lever engages each of the four ratios obtainable in the forward gear section in the manner as described above. While the first 4 forward speed ratios are being obtained the planetary gear set in the rear section 12 has brake 83 applied providing a reduced drive ratio of 3.3:1. Thus through the first 4 forward speed ratios the overall gear ratio is the gear ratio obtainable in each of the ratios of the front gear set times the ratio provided by the rear planetary gear set, namely 3.3:1. For example, in the 4th speed ratio when the direct drive is selected in the forward gear section the front section is thus in the 1:1 ratio and the overall ratio as shown by the table is thus 3.3:1 or the ratio of the rear planetary gear set.

As the manual lever 21 is moved between the 4th and 5th positions a mechanism is provided for shifting the rear planetary gear set from its reduced drive function to direct drive by interrupting the supply of air pressure to brake 83 and clutch 82 and thereby release brake 83 and apply direct drive clutch 82. The rear planetary gear set at this time acts as a direct connection between intermediate shaft 16 and output shaft 17 providing a 1:1 drive ratio. Thus the 5th, 6th, 7th and 8th speed ratios are the ratios obtainable in the front gear section since, in effect, the rear planetary gear section is at this time locked out. When the transmission is downshifted the mechanism for shifting the rear planetary gear set from a direct drive condition to a reduced drive condition by supplying air pressure to clutch 82 and apply brake 83 will again be actuated when the manual lever 21 is moved between the 5th and 4th speed ratio position.

The operation of the mechanism for changing the ratio of the rear planetary gear set in response to the movement of the manual lever 21 will now be described.

Referring to FIGURES 1 and 4 manual lever 21 has a bifurcated end thereon having legs 201 and 202. As shown in FIGURE 1 the side view of one of the legs illustrates that the leg has a spherical profile so as to cooperate with the grooves in the shift collars. A shift tower 205 is provided for the manual lever 21 which is attached to the case 20 by suitable means to hold same securely in position. A cap 206 is provided on the shift tower. The manual shift lever 21 extends through an aperture 207 in the cap 206. Provided on the manual shift lever 21 is a spherical bearing 208 which allows pivotal movement of the manual shift lever 21 with respect to the tower 205. The spherical bearing 208 has a slot 210 therein. The tower 205 has a pin 211 provided therein which engages slot 210 so that the pivotal movement of manual shift lever 21 is confined to two planes of movement, the planes being illustrated by clockwise or counterclockwise rotation of manual shift lever 21 about the center of spherical bearing 208 as viewed in FIGURE 4 and clockwise or counterclockwise movement of manual lever 21 about the center of spherical bearing 208 as viewed in FIGURE 1.

Referring to FIGURE 3 the shift rails 22, 23 and 24 are illustrated. The mechanism as indicated at 212 is a commonly known method of interlocking the shift rails which prevents engagement of more than one ratio of the front section 11 at one time, the operation of which is unimportant with regard to the present invention being described.

Figure 5:
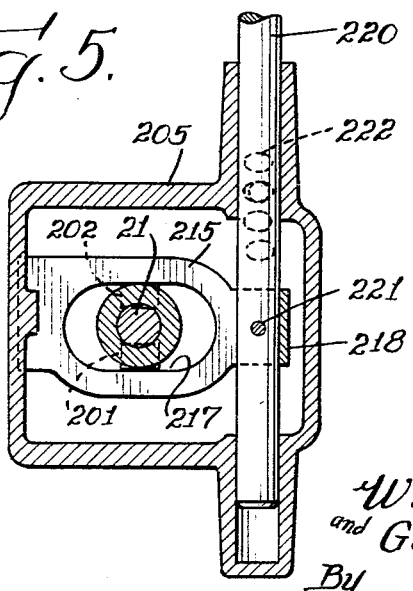
FIGURE 5 is a cross-sectional view taken along the lines 5—5 of FIGURE 4.

Referring to FIGURES 1 and 5 the structure for sensing the position of the manual shift lever 21 to determine the ratio of the rear planetary gear set 75 is illustrated. A guide plate 215 is provided which may slide in a groove 216 provided in the shift tower 205. The plate 215 has a central aperture 217 within which manual lever 21 may move. An end portion 218 of plate 215 encircles shaft 220 and is secured thereto for example, by a pin 221. The shaft 220 is mounted for sliding movement with respect to the tower 205 in response to movement of manual shift lever 21.

For example, referring to FIGURE 2 movement of the shift lever along a horizontal line illustrated by the central horizontal line in FIGURE 2 to find the proper location for movement of the manual shift lever up or down as viewed in FIGURE 2 to select a particular ratio will result in sliding movement of shaft 220. The shaft 220 has a series of indentations 222 thereon which will cooperate with a detent mechanism (not illustrated) thereby providing shaft 220 with four axial positions which represent the positions between first and second, third and fourth, fifth and sixth, and seventh and eighth ratio positions as viewed in FIGURE 2. When the manual lever 21 is moved rotationally as viewed in FIGURE 1 to move one of the shift collars to engage a particular ratio, due to the elongated aperture 217, this movement occurs with no axial movement of guide plate 215 or shaft 220.

Referring to FIGURE 4 the manual shift lever has five positions to select one of the shift rails for movement to engage a particular ratio. The full line position of manual lever 21 represents a position of the manual lever corresponding to the 5th and 6th position indicated on FIGURE 2. The dotted line positions in FIGURE 4 show the extreme movement of the lower end of manual lever 21 to the left or right. With the manual lever in the dotted line position to the left leg 201 is engaged with shift rail 24 so that the reverse ratio may be obtained. In the dotted line position of manual lever to the right leg 201 engages shift rail 23 to establish either first or second ratios by movement of shift fork 32. The ratios are obtained with various positions of the shift fork 32 with a particular leg 201 or 202 engaging a particular shift rail in accordance with the following table:

| Ratio | Leg | Engages rail |
|---|---|---|
| 1st | 201 | 23 |
| 2nd | 201 | 23 |
| 3rd | 201 | 22 |
| 4th | 201 | 22 |
| 5th | 202 | 23 |
| 6th | 202 | 23 |
| 7th | 202 | 22 |
| 8th | 202 | 22 |
| Rev | 201 | 24 |

Referring to FIGURE 6 the control system for the transmission is illustrated. A source of air pressure represented by compressor 230 is provided. The control system includes a sensing valve 231, a directional valve 232 and shift valves 233 and 234.

A conduit 235 connects the compressor 230 with the shift valve 234 and sensing valve 231. A conduit 238 connects sensing valve 231 with shift valve 233 and directional valve 232. A conduit 239 connects shift valve 234 with directional valve 232. A conduit 240 connects shift valve 233 to the port 116 for the servomotor for brake 83 and to shift valve 234.

A conduit 241 connects shift valve 233 to the servomotor for clutch 82 and to directional valve 232.

Sensing valve 231 is provided with an exhaust port 250 and includes a piston 251 having sealing rings 252 and 253 thereon. The piston 251 is urged to its lower position as illustrated in FIGURE 6 by a spring 254. An extension of shaft 220 is illustrated in FIGURE 6 which is provided with means to control sensing valve 231. The shaft 220 is provided with grooves 260, 261, 262 and 263. A detent mechanism 265 is provided which has a ball 266 urged into engagement with either of grooves 261 or 262 by a spring 267. However, an additional detent mechanism located at each of the four axial positions in shaft 220 for the forward ratios and represented by indentations 222, shown in FIGURE 5, is a separate detent mechanism not illustrated in FIGURE 6. A ball 270 is provided which may engage either groove 260 or 263 on shaft 220. The ball 270 is engaged by a spring 271 which also contacts the piston 251.

Directional valve 232 comprises a piston 280 having sealing rings 281 and 282 thereon. The piston 281 is urged to the right by spring 283.

Shift valve 233 includes a piston 290 having a groove 291 thereon and a land 292 having sealing rings 293 and 294 thereon. A spring 295 urges piston 290 to the right as viewed in FIGURE 6. Shift valve 233 is also provided with exhaust ports 296 and 297.

Shift valve 234 is of identical construction to shift valve 233 and corresponding structural elements have the same identifying numerals thereon with the addition of a small "a."

The operation of the control system for the improved transmission mechanism is as follows: When the manual shift lever is positioned to engage either the first, second, third or fourth ratios the shaft 220, as illustrated in FIGURE 6, will be in a position with groove 260 being engaged by ball 270. With the ball 270 engaging groove 260 piston 251 of sensing valve 231 will be in its lower position and air pressure supplied through conduit 235 will flow into conduit 238. Pressure in conduit 238 will urge directional valve 232 to the left admitting air pressure through conduit 241 to shift valve 233 and to the clutch servomotor for clutch 82.

When the air pressure builds up to a predetermined value which, for example, would be 60 p.s.i., piston 290 of shift valve 233 will move to the left thereby allowing air pressure in conduit 238 to flow through groove 291 into conduit 240 to the servomotor to engage brake 83 to put the planetary gear set 75 in its reduction ratio as is necessary for first, second, third, or fourth speed ratios. Air pressure in conduit 240 will also move piston 290a of shift valve 234 to the left as viewed in FIGURE 6. With the piston 290a in this position air pressure will flow from conduit 235 through groove 291a into conduit 239.

Air pressure in conduit 239 with the aid of spring 283 will move piston 280 of directional valve 232 to the right thereby allowing air pressure into conduit 241 from conduit 239 rather than conduit 238. The clutch will thus be held released with pressure in conduit 241. It is important that the clutch be released before the brake is engaged when going from direct drive ratio to reduced drive ratio in the planetary gear set. Therefore the shift valve 233 is set at a value as for example 60 p.s.i., which allows the clutch to be completely released before the piston 290 moves to the left to admit air pressure to the servomotor for brake 83. Since shift valve 234 is set at 10 p.s.i., piston 290a of shift valve 234 will immediately move to the left when air pressure is supplied in conduit 240 to admit the air pressure into conduit 239 and thereby into conduit 241 back to shift valve 233. In this manner the transmission will remain in the reduction drive ratio as far as the planetary gear set is concerned for second, third and fourth speed drive ratios.

After fourth speed drive ratio has been established and the operator moves the manual lever toward fifth speed position ball 270 will be moved up by the area of shaft 220 between grooves 260 and 263. When this happens piston 251 of sensing valve 231 will be moved up thereby exhausting conduit 238 through port 250. When conduit 238 is exhausted fluid pressure will be exhausted from the brake servomotor and from shift valve 234 through conduit 240 and groove 291 of shift valve 233. Thus the brake will be immediately exhausted of air pressure so that it may be released. Spring 295a now moves piston 290a of shift valve 234 to the right when the pressure in conduit 240 gets below 10 p.s.i. for example, interrupting the flow of air pressure from conduit 239 through valve 232 to valve 233 and to the servomotor for clutch 82 and connecting conduit 239 to exhaust through port 296a. With conduit 239 exhausted of air pressure, the directional valve 232 will remain to the right due to the action of spring 283.

Fluid pressure is now exhausted from the shift valve 233 and the servomotor for clutch 82 thereby moving piston 290 of shift valve 233 to the right to interrupt the connection between conduits 238 and 240 through shift valve 233. Due to the fact that air pressure for clutch 82 and valve 233 flows from the valve 234 the brake 83 will be released before the supply of air to the clutch 82 is interrupted insuring that the brake 83 is released before the clutch 82 is engaged.

As explained previously with the air pressure exhausted from each of the servomotors for clutch 82 and brake 83, brake 83 will be disengaged and clutch 82 engaged to put the planetary gear set in its direct drive ratio. Thus the planetary gear set is conditioned for fifth, sixth, seventh and eighth speed ratios in correspondence to the axial position of shaft 220 at this time.

Since in the reverse ratio the reduction of the rear planetary gear set is desired, groove 263 is provided for ball 270 to move into when the reverse ratio is selected by manual lever 21 so that the planetary transmission will again be placed in the reduction ratio as desired in reverse position and in the manner above with regard to establishment of first, second, third and fourth speed ratios.

From the above it will be apparent that the present invention comprises an improved and novel transmission mechanism where any one of eight forward speed ratios may be obtained by movement of a single manual lever. Further, by addition of a planetary gear set in connection with a manual 4-speed transmission eight forward ratios have been obtained in a simple manner with a minimum of structural mechanism. An improved control system has been provided utilizing air pressure normally present in truck environments for automatically shifting the planetary gear set in the rear section of the transmission in accordance with position of the manual selector lever. Thus the operator of a truck for example, has been relieved of the responsibility for conditioning the planetary gear set for reduction or direct drive as is necessary in the case of 2-speed rear axle mechanisms of known types used in trucks.

Further, a simplified shift lever and shift rail mechanism is utilized to operate shift rails to select any of the ratios desired in an efficient and rapid manner. Detent mechanism has been provided to insure that the operator will have a feel and definite position of the manual lever for each of the ratios provided.

Further, the control system of the present invention is constructed in a manner to provide that if the air pressure fails in the system the planetary gear set will remain in its 1:1 drive ratio insuring adequate engine braking when air pressure fails.

Various of the features of the invention have been particularly shown and described; however, it should be obvious to one skilled in the art that various modifications may be made therein without departing from the scope of the invention.

We claim:
1. A planetary transmission including a casing for said transmission,
    an input element, an output element, and a reaction element, said elements drivingly intermeshed,
    a brake mechanism connected to said reaction element and engageable to hold said reaction element stationary to produce a reduced drive ratio through said mechanism,
    a clutch mechanism connected to said reaction element and to said input element and engageable to interconnect said reaction and input elements to produce a direct drive ratio through said mechanism,
    said brake mechanism including fluid pressure responsive means and an annular spring movable by said fluid pressure responsive means to act as a lever mechanism to apply said brake,
    said brake and clutch mechanism being generally axially aligned,
    said clutch mechanism including an annular spring adapted to engage said clutch mechanism and a fluid pressure responsive member operatively associated with said spring to release said clutch mechanism when fluid pressure is imposed on said fluid pressure responsive member whereby when the supply of fluid pressure to said brake and clutch mechanisms is interrupted said clutch mechanisms will be engaged and said brake mechanisms released and said planetary gear mechanism will be in a direct drive ratio condition.

2. A transmission mechanism as claimed in claim 1 wherein said clutch mechanism includes a clutch apply plate, said annular spring being in contact with said apply plate to move said apply plate to engage said clutch, said fluid pressure responsive member being connected to a clutch drum member which encircles said clutch, said clutch drum member having a plurality of inwardly extending indentations will move said clutch apply plate to release said clutch mechanism when fluid pressure is applied to said fluid pressure responsive member.

3. A transmission mechanism as claimed in claim 2 wherein said fluid pressure responsive member comprises a piston, said clutch mechanism including a hub member having an annular cavity in which said piston is mounted, said piston comprising an annular member drivingly connected to said clutch drum and adapted to move said clutch drum axially to release said clutch mechanism.

4. A planetary transmission including a casing for said transmission,
    an input element, an output element, and a reaction element, said elements drivingly intermeshed,
    a brake mechanism connected to said reaction element and engageable to hold said reaction element stationary to produce a reduced drive ratio through said mechanism,
    a clutch mechanism connected to said reaction element and to said input element and engageable to interconnect said reaction and input elements to produce a direct drive ratio through said mechanism,
    said brake mechanism including fluid pressure responsive means and an annular spring movable by said fluid pressure responsive means to act as a lever mechanism to apply said brake,
    said brake and clutch mechanisms being generally axially aligned,
    said clutch mechanism including an annular spring adapted to engage said clutch mechanism and a fluid pressure responsive member operatively associated with said spring to release said clutch mechanism when fluid pressure is imposed on said fluid pressure responsive member, said fluid pressure responsive means for said brake comprising an annular piston, said piston being mounted in an annular cavity provided in said casing, a brake apply plate mounted in said casing, said annular spring for said brake mechanism being mounted within said casing to pivot on said casing and being in contact with said brake apply plate whereby when said piston is moved by fluid pressure said piston will pivot said annular spring to move said brake apply plate to apply said brake and said annular spring serving to return said piston when the supply of fluid pressure is interrupted.

5. A transmission mechanism including input and output shafts, a first gear mechanism providing a plurality of forward gear ratios and a second gear mechanism providing a plurality of gear ratios, said first and second gear mechanisms being connected in series between said input and output shafts, a single manually operable means adapted to select any of said plurality of ratios in said first gear mechanism and a predetermined ratio in said second gear mechanism, a source of fluid pressure, a pair of fluid pressure responsive friction means for said second gear mechanism, valve means actuatable to connect said pressure to said fluid pressure responsive means whereby one of said ratios will be established in said second gear mechanism, said valve means also being actuatable to exhaust fluid pressure from said fluid pressure responsive means whereby another of said ratios will be established in said second gear mechanism, said valve means being connected to said manual means whereby when said manual means is moved to establish one of said ratios in said first gear mechanism said valve means will be actuated by said manual means to establish a predetermined gear ratio in said second gear mechanism.

6. A transmission as claimed in claim 5 including axially movable means connected to said manual means, said axially movable means being operatively associated with said valve means to thereby actuate said valve means in response to movement of said manual means.

7. A transmission mechanism as claimed in claim 6 wherein said axially movable means comprises a shaft having grooves on a portion thereof and in contact with said valve means to actuate said valve means.

8. A control mechanism for a transmission, said transmission including a pair of fluid pressure responsive means actuatable to establish a plurality of drive ratios in said transmission, said control mechanism including a source of fluid pressure, sensing valve means connected to said source of fluid pressure, manual means engageable with said sensing valve means, a first valve means and a second valve means connected to said sensing valve means, said sensing valve means being adapted to connect said fluid pressure with said first valve means in response to movement of said manual means, said first valve means being adapted to move in response to said fluid pressure to connect said fluid pressure to said second valve means and to one of said fluid pressure responsive means to establish a particular drive ratio in said transmission and to connect said fluid pressure to said second valve means to actuate said second valve means whereby said second valve means connects said source of pressure to the other of said fluid pressure responsive means and to said first valve means to hold said first valve means in its position connecting fluid pressure to said one fluid pressure responsive means.

9. A control mechanism as claimed in claim 8 wherein said first valve means is adapted to be moved at a higher pressure value than said second valve means said first valve means being connected with said second valve means so that said second valve means is not supplied with fluid pressure until said first valve means moves.

10. A control mechanism as claimed in claim 9 wherein when said manual means is moved to change the ratio in said transmission, said sensing valve means will exhaust fluid pressure from said one fluid pressure responsive means and said second valve, said other fluid pressure responsive means being exhausted of fluid pressure only after said second valve means returns to its position prior to being moved by said fluid pressure, whereby establishment of more than one ratio simultaneously is prevented.

References Cited
UNITED STATES PATENTS

| | | | |
|---|---|---|---|
| 2,232,796 | 2/1941 | Maurer | 74—740 |
| 2,775,330 | 12/1956 | Schjolin et al. | 192—87.16 |
| 2,869,400 | 1/1959 | Langdon | 74—740 X |
| 2,870,655 | 1/1959 | Rockwell | 192—18.1 X |
| 2,918,832 | 12/1959 | Meyers | 74—785 |
| 3,069,929 | 12/1962 | Hansen | 192—18.1 X |
| 3,319,491 | 5/1967 | Simpson | 74—740 |

FOREIGN PATENTS 508,846 10/1930 Germany.

FRED C. MATTERN, JR., *Primary Examiner.*

ARTHUR T. McKEON, *Assistant Examiner.*